(12) United States Patent
Kumar et al.

(10) Patent No.: US 9,328,312 B2
(45) Date of Patent: May 3, 2016

(54) SUBCRITICAL WATER ASSISTED OIL EXTRACTION AND GREEN COAL PRODUCTION FROM OILSEEDS

(71) Applicant: Tyton Biosciences, LLC, Danville, VA (US)

(72) Inventors: Sandeep Kumar, Norfolk, VA (US); Sergiy Popov, Norfolk, VA (US); Peter J. Majeranowski, Norfolk, VA (US); Igor Kostenyuk, Danville, VA (US)

(73) Assignee: Tyton Biosciences, LLC, Danville, VA (US)

( * ) Notice: Subject to any disclaimer, the term of this patent is extended or adjusted under 35 U.S.C. 154(b) by 0 days.

(21) Appl. No.: 14/437,846

(22) PCT Filed: Oct. 15, 2013

(86) PCT No.: PCT/US2013/064966
§ 371 (c)(1),
(2) Date: Apr. 23, 2015

(87) PCT Pub. No.: WO2014/066097
PCT Pub. Date: May 1, 2014

(65) Prior Publication Data
US 2015/0267141 A1    Sep. 24, 2015

Related U.S. Application Data

(60) Provisional application No. 61/717,219, filed on Oct. 23, 2012.

(51) Int. Cl.
*C11B 1/10*    (2006.01)
*C11B 1/04*    (2006.01)

(52) U.S. Cl.
CPC .... *C11B 1/10* (2013.01); *C11B 1/04* (2013.01)

(58) Field of Classification Search
CPC .................................... C11B 1/10; C11B 1/04
USPC ........................................................... 554/15
See application file for complete search history.

(56) References Cited

U.S. PATENT DOCUMENTS

| 2007/0014912 | A1 | 1/2007 | Mazza et al. |
| 2010/0175690 | A1 | 7/2010 | Nagahama et al. |
| 2012/0301928 | A1 | 11/2012 | Bae et al. |
| 2013/0206571 | A1* | 8/2013 | Heilmann ............ B01D 9/0013 201/3 |
| 2014/0271951 | A1 | 9/2014 | Mua et al. |

OTHER PUBLICATIONS

USPTO, Non-Final Rejection for U.S. Appl. No. 14/270,839, Oct. 2, 2015.

* cited by examiner

*Primary Examiner* — Deborah D Carr
(74) *Attorney, Agent, or Firm* — NK Patent Law, PLLC

(57) ABSTRACT

Provided herein are methods of optimizing energy recovery from oilseeds. The methods disclosed provide at least the ability to swell oilseeds and disrupt the cell walls (hulls) without changing the functionality and quality of oil; the process integration of oil extraction and green coal production to maximize the energy recovery in the form of crude oil and green coal from oilseeds; and heat integration during processing stages including subcritical water pretreatment, oil extraction, and subcritical water carbonization to minimize the process heat requirement.

14 Claims, 6 Drawing Sheets

SUBCRITICAL WATER ASSISTED OIL EXTRACTION AND GREEN COAL PRODUCTION FROM OILSEEDS

CROSS REFERENCE TO RELATED APPLICATION

This application is a 35 U.S.C. 371 national stage of International Patent Application No. PCT/US2013/064966 filed on Oct. 15, 2013, and claims priority to U.S. Provisional Patent Application Ser. No. 61/717,219 filed on Oct. 23, 2012 and incorporated herein by reference in its entirety.

BACKGROUND

Oilseeds are grains that are valuable for the oil content they produce. Some of these oilseeds are cotton seeds, rapeseeds, mustard, sunflower, safflower, tobacco seeds, sesame soybeans, cotton seed, flaxseed, and canola seed. The oil content in these seeds depends on the type of plants, but it is common to get 15-50 weight % of oil in the total seed mass. Table 1 shows the oil content in some common seeds on a dry basis:

| Seeds | Moisture content (wt %) | Oil/Fat content (wt %) |
|---|---|---|
| Cotton | 5 | 15-25 |
| Rape | 9 | 40-45 |
| Mustard | 7 | 25-45 |
| Sesame | 5 | 25-50 |
| Sunflower | 5 | 25-50 |
| Safflower | 5 | 25-30 |
| Tobacco | 7 | 35-45 |

Oilseeds are used chiefly to produce vegetable oil and oilseed meal, which in turn are used to produce food fats and oil products, as well as animal feed for poultry, hogs, and cattle. Other applications are in soap-making, cosmetics, detergents, or as an ingredient in other foods.

Recently, non-food bases oils (e.g., tobacco seeds, cotton seeds) are being envisioned as a renewable feedstock for producing biodiesel or other alternative fuels. The procedures to extract oil from seeds are generally solvent extraction and pressing. At commercial scales, the seeds are subjected to a number of processing steps prior to oil extraction. The oilseed is first cleaned to remove trash, dirt, and sand before subjecting the oilseeds to mechanical extraction such as pressing or solvent extraction process. The conventional method of pressing the seeds leaves too much high value oil in the seed cakes. Therefore, solvent extraction methods are used to maximize the oil extracted.

Solvent extraction achieves more complete oil recovery than mechanical extraction but requires a thorough preparation of the feedstock (e.g. drying, cleaning, dehulling, conditioning, flaking, cooking/tempering, pre-pressing, etc.) Solvent extraction removes the oil from a flaked seed or oil-cake by treating the flaked seed or oil-cake with non-polar solvents such as hexane. FIGS. 1A and 1B illustrate the major steps involved in oil extraction using pressing and solvent extraction. These processes are generally expensive and have some well-known challenges, such as additional seed preparation stages, use of dry seeds, primer pressing, steam cooking to facilitate the solvent extraction process, long extraction time, loss of volatile compounds, and the generation of large amount of toxic solvent/chemical waste. Accordingly, improved processes are desired.

SUMMARY

Disclosed herein are processes for optimizing energy recovery from an oilseed. Energy recovery is optimized by producing both crude oil and green coal from the oilseeds. One method disclosed herein comprises pre-treating whole oilseeds with subcritical water at a pretreatment temperature, separating pretreated oilseeds from a pretreated liquid phase and extracting crude oil from the pretreated oilseeds using an organic solvent.

The method can further comprise separating a solid phase from the crude oil after extraction and producing green coal from the solid phase with subcritical water carbonization of the solid phase at a carbonization temperature. The method can further comprise also producing green coal from the pretreated liquid phase with subcritical water carbonization of the liquid phase at the carbonization temperature.

The methods disclosed provide at least the ability to swell oilseeds and disrupt the cell walls (hulls) without changing the functionality and quality of oil; the process integration of oil extraction and green coal production to maximize the energy recovery in the form of crude oil and green coal from oilseeds; and heat integration during processing stages including subcritical water pretreatment, oil extraction, and subcritical water carbonization to minimize the process heat requirement.

The integrated processes disclosed provide several major advantages over conventional processes including higher oil yield, shorter extraction time, tolerance to high moisture content of the feedstock, elimination of preparation stages, and utilization of the extracted solid residue for green coal production.

The most energy-intensive and costly stage in the production of fuels from oil-based feedstock is extraction and purification of oils derived from the biomass feedstock. The processes disclosed herein concentrate on extraction and purification of oil from the biomass, and in particular from oilseeds. With the use of the disclosed processes, as much as 85% of the energy content in oilseeds is expected to be recovered in the form of products such as crude oil and green coal. The extracted oils can be readily converted into biodiesel through the well-studied transesterification process or into renewable diesel and advanced biofuels (jet fuel, green diesel) through the catalytic hydrodeoxygenation process, as examples. Valuable byproducts are also produced which can be used in the cosmetics/pharmaceutics industry. The green coal produced from the residue has application as a solid fuel.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Subcritical water is a non-toxic, environmentally benign, inexpensive, and green solvent which can be used as an alternative to conventional organic solvents generally used in the solvent extraction process, such as n-hexane. Liquid water below the critical point is referred to as subcritical water. In the subcritical region, the ionization constant ($K_w$) of water increases with temperature and is about three orders of magnitude higher than that of ambient water, and the dielectric constant ($\in$) of water drops from 80 to 20. A low $\in$ allows subcritical water to dissolve organic compounds, while a high $K_w$ allows subcritical water to provide an acidic medium for the hydrolysis of biomass components. Because of its tunable solvent properties, subcritical water can be employed to extract many organic components from biomass.

Subcritical water pretreatment, also referred to herein as hydrothermal pretreatment, of the oilseeds increases the accessibility to the oils encased inside the hulls. The subcritical water swells oilseeds to disrupt the seed walls (hulls) without changing the functionality and quality of oil. The subcritical water increases the Brunauer-Emmett-Teller (BET) surface area, the pore volume and the pore diameter. Cell walls, in general, are organized in a conventional framework. The basic framework is highly polymeric. Interspersed within the framework are lower molecular weight polymers, inorganic, and non-monomeric compounds. The solvent properties of subcritical water in the range of 120-220° C. are used for 5 to 60 minutes of pretreatment time to hydrolyze the amorphous or water-soluble components of cell walls and enhance the solvent's accessibility for extracting oils in the subsequent stage. With the removal of amorphous components after subcritical water pre-treatment, surface modifications (e.g. creation of cracks and pores) occur as a result of mild hydrolysis over the cell wall surface. As non-limiting examples, oilseeds include cotton seeds, rapeseeds, mustard seeds, sunflower seeds, safflower seeds, jathopha seeds, tobacco seeds, sesame soybeans, cotton seeds, flaxseeds, and canola seeds.

Figure 1A:
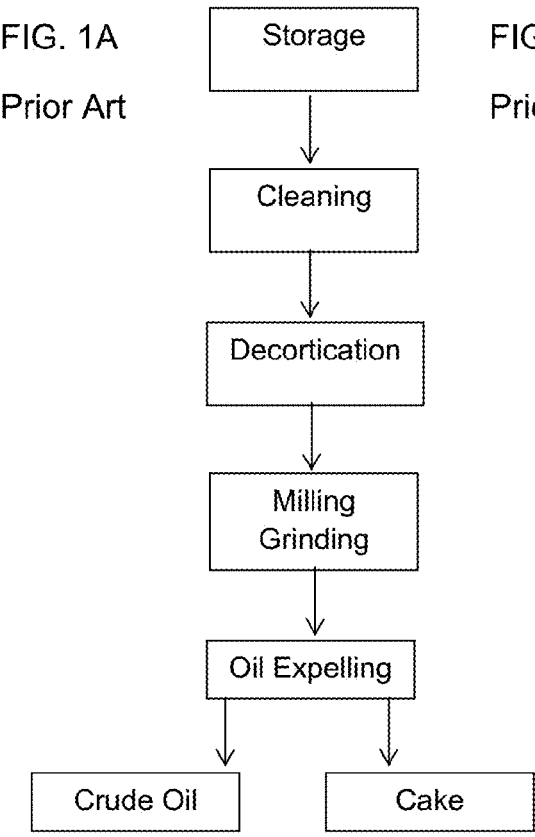
FIG. 1A illustrates major steps involved in conventional oil extraction from oilseeds via pressing.
Figure 1B:
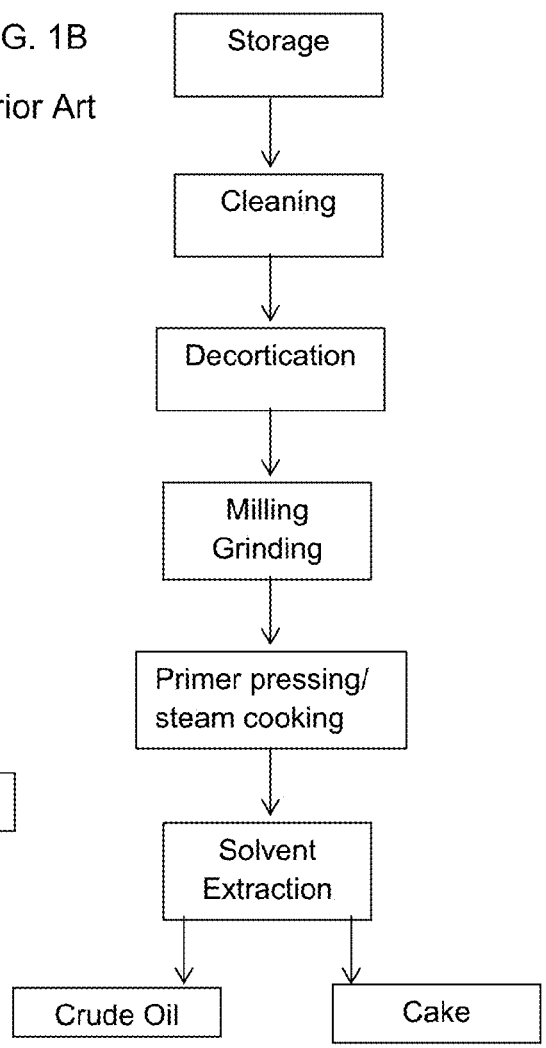
FIG. 1B illustrates major steps involved in conventional oil extraction from oilseeds via solvent extraction.
Figure 2:
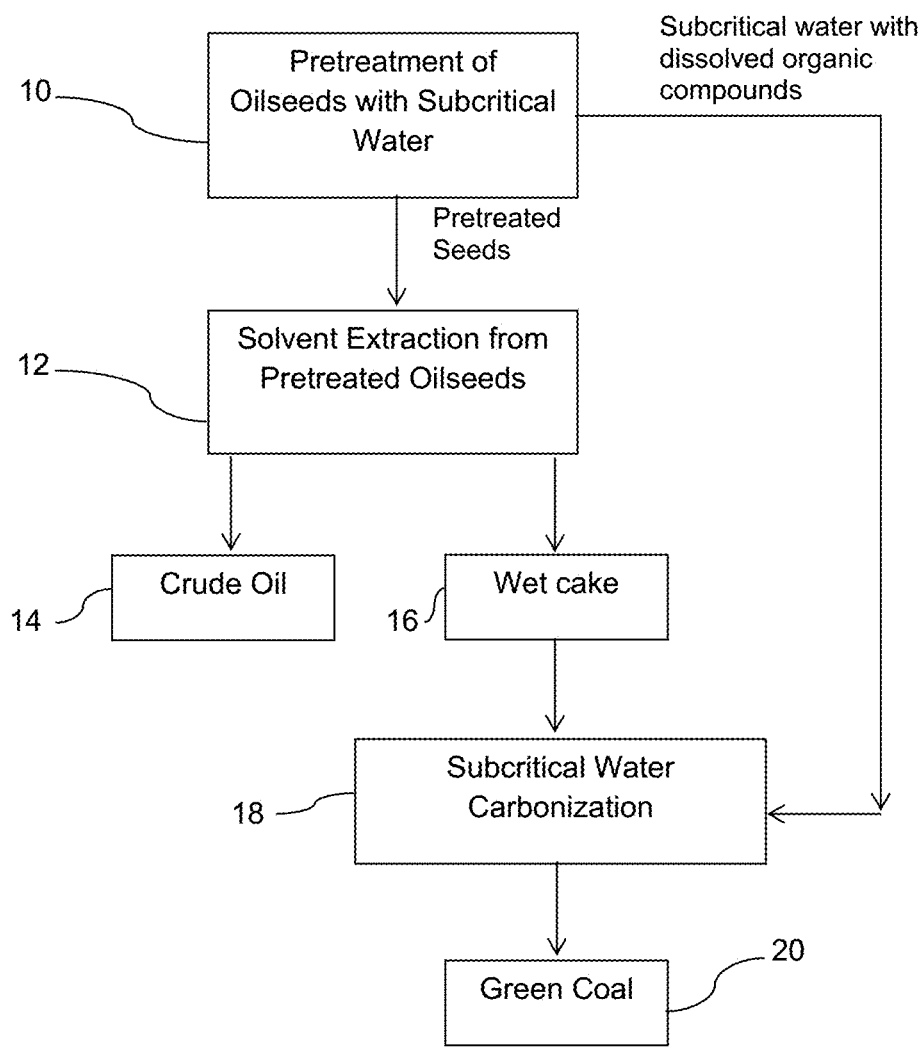
FIG. 2 is a flow diagram of the processes disclosed herein.

FIG. 2 is a flow diagram of a process for producing crude oil and green coal from oilseeds. As illustrated, in step 10, the oilseeds are subjected to subcritical water pre-treatment. The temperature range of 120-220° C. for the pretreatment is selected based on the hydrolyzing properties of subcritical water for biopolymers. Above 220° C., subcritical water starts hydrolyzing biomass polymers (cellulose, proteins) to water-soluble compounds that leads to liquefaction of biomass components as well as hydrolysis of oils to fatty acids. In other words, the oilseed cell material (i.e., hulls) would be liquefied as oxygenated hydrocarbons in the aqueous phase during such extraction procedures. Due to the higher liquefaction/extraction temperature used (250-350° C.), the quality of oil is not preserved and part of oil is hydrolyzed to fatty acids. Furthermore, no wet cake is produced.

Because swelling the oilseeds rather than liquefying the oil seeds is desired, the subcritical water pretreatment temperature is at or kept below 220° C. This not only helps in protecting oil quality, but also preserving the oilseed cell materials or hulls which can be used for the green coal production in subcritical water.

The oil is extracted from the pretreated seeds using organic solvents in step 12. Organic solvents such as n-hexane, ethanol, methanol, chloroform, acetone, dichloromethane, and petroleum ethers can be used for the oil extraction from the subcritical water pretreated seeds. Extraction can be performed using a Soxhlet extraction apparatus, as a non-limiting example. The liquid phase and solid phases are separated after extraction, with the liquid phase being crude oil 14 which can be further processed for use as a biofuel.

The solid phase is a wet cake 16. The wet cake 16 is subjected to subcritical water carbonization, also referred to herein as hydrothermal carbonization, in step 18 to make green coal 20 from the wet cake recovered after the oil extraction. The subcritical water carbonization process occurs in the temperature range of 220-300° C. The subcritical water from the pretreatment step 10 has dissolved organic compounds and can also undergo subcritical water carbonization in step 18. The subcritical water product and the wet cake can be fed together or separately. The temperature of the subcritical water product assists in reducing costs as the temperature is increased in the subcritical water carbonization step 18. Therefore, the process heat requirements are reduced.

The disclosed processes provide the following:

A comparable oil yield;

Seed preparation stages (cleaning, decortications, and milling/grinding) are eliminated in the disclosed process.

Oilseeds with high moisture content can be directly used without the need for additional drying.

Extracted oil looks transparent and is free from suspended solids when compared to the conventional solvent extraction process.

Lower extraction time is required to obtain comparable oil yield.

Wet cake residue after oil extraction is used for the green coal production.

Batch, semi-batch, and continuous flow reactors can be used for the pretreatment and subcritical water carbonization.

Microwave heating can be used during subcritical water pretreatment and subcritical water carbonization process. Microwave assisted processes will require less than five minutes of processing time.

The integrated approach of oil extraction and production of green coal from oilseeds provides a unique opportunity to maximize the overall energy recovery from oilseeds. To quantify the amount of energy being retained in extracted oil and the green coal with respect to the initial energy input from oilseeds, energy conversion ratio (ECR) is defined as:

$$ECR(\%) = \left(\frac{\text{Weight of oil} * HHV \text{ of oil}}{\text{Weight of oilseeds} * HHV \text{ of oilseeds}}\right) * 100 +$$
$$\left(\frac{\text{Weight of green coal} * HHV \text{ of green coal}}{\text{Weight of oilseeds} * HHV \text{ of oilseeds}}\right) * 100$$

In subcritical water based processes, water is kept in the liquid phase by applying pressure. Thus latent heat typically required for the phase change of water from liquid to vapor phase (2.26 MJ/kg of water) is not necessary. Because the latent heat is not required, the energy requirement is reduced compared to steam based processes. As an example, 2.869 MJ/kg of energy is required to convert ambient water to steam at 250° C. and 0.1 MPa, whereas only 0.976 MJ/kg (about one third of the energy) is required to convert ambient water to subcritical water at 250° C. and 5 MPa. This also means that the energy contained in the subcritical water is insufficient to vaporize the water on decompression. Further, it is possible to recover much of the heat (more than two thirds of the heat) from subcritical water. Therefore, if 1 kg of water is to be heated to subcritical water condition at 250° C. for the subcritical water carbonization process/oil extraction stage, it will require about 1 MJ/kg of process heat.

Subcritical water pretreatment is an efficient process that allows avoiding grinding and other preparation of seeds to obtain cleaner oil suitable for biodiesel production. Higher oil yields were obtained when n-hexane is used as a solvent as compared to ethanol. The solids residue after oil extraction (wet cake) allows producing green coal using the wet cake and liquid generated during subcritical water pretreatment of the oilseeds. Subcritical water carbonization of the wet cake and liquid to produce green coal is an efficient means to utilize the oilseed residue. The heating value of green coal is comparable to that of bituminous grade coal and thus can have potential applications in co-firing or other solid fuels applications.

A study was conducted using different oilseeds. The five types of oilseeds are used: cottonseeds, flaxseeds, yellow mustard seeds, canola (rape) seeds, and tobacco seeds. The cottonseeds were obtained from a local farm in Virginia, the flaxseeds, mustard seeds, and canola seeds were purchased accordingly from Superior Nut Company, Cambridge, Mass., Penzeys Spices, Wauwatosa, Wis., and Seedland, Wellborn, Fla. The tobacco seeds were provided by Tyton BioSciences, Danville, Va. All the seeds were dried overnight in an oven at 65±3° C., packed in plastic bags, and stored in a dark and dry place at room temperature before being used. The moisture content of the seeds, determined with a moisture meter Denver Instrument IR 35 by drying the ground seeds at 105° C. to constant weight, was ≤1%.

Figure 3:
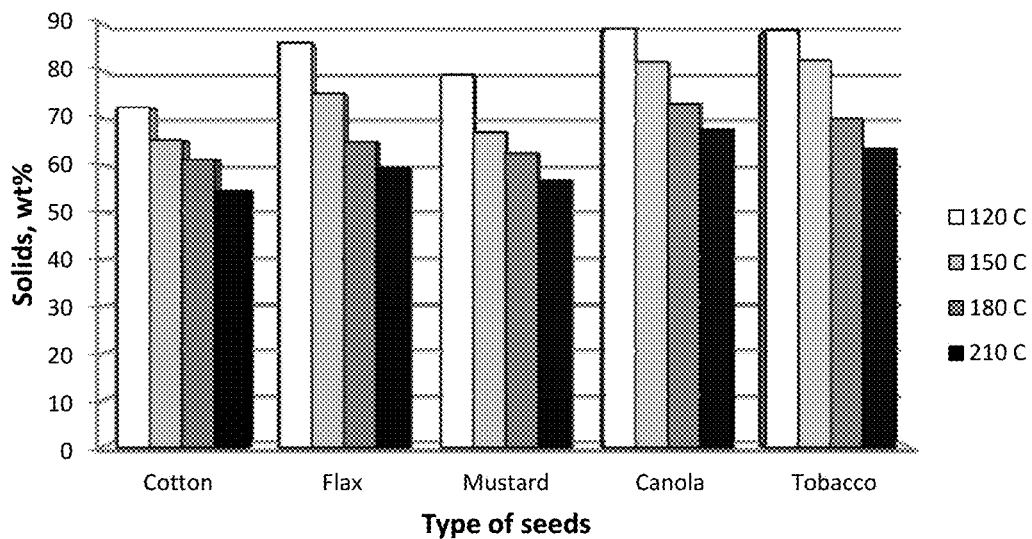
FIG. 3 is a table of different oilseeds and their corresponding weights after subcritical water pretreatment.

Subcritical water pretreatment (or hydrothermal pretreatment) of the seeds was carried out in a 500 mL batch reactor with a Parr 4848 controller at 120±1, 150±1, 180±1, and 210±1° C. (the respective autogenous pressures were 30, 100, 250, and 500±5 psi) for 30 minutes with continuous stirring at 300 RPM. In a typical experiment, the reactor was loaded with 30 grams of the seeds and 300 mL of deionized water, sealed, and kept under the above conditions. After cooling down to the room temperature, the solid and liquid phases were separated by vacuum filtration. The solid phase (pretreated seeds) was dried in an oven at 65±3° C. overnight until the moisture content was below 1%. After the subcritical water pretreatment, the oilseeds became dark but were not crushed and retained the original shapes. The weight of the seeds after the subcritical water pretreatment is provided in FIG. 3.

Figure 4:
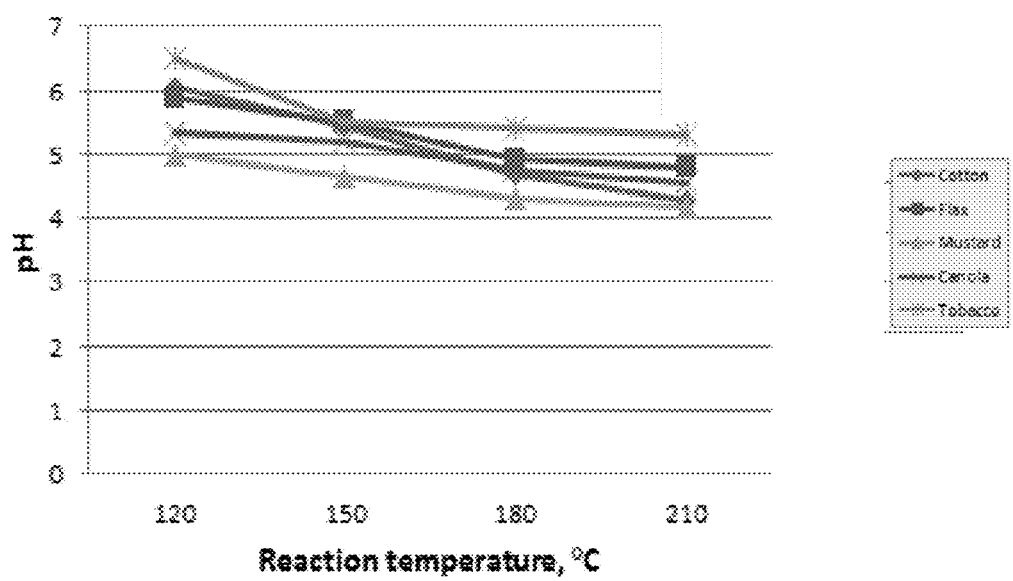
FIG. 4 is a graph showing the pH of the aqueous phase after subcritical water pretreatment.
Figure 5:
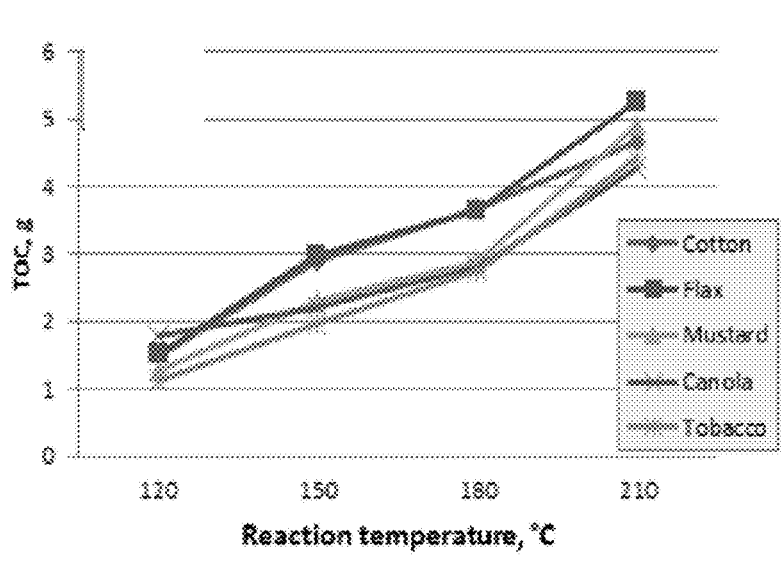
FIG. 5 is a graph showing the total organic carbon of the aqueous phase after subcritical water pretreatment.

The aqueous phase was analyzed for pH and total organic carbon (TOC) with Shimadzu $TOC_{VPN}$ analyzer. The results of the analyses are provided in FIGS. 4 and 5, respectively. The subcritical water pretreatment of the oilseeds promotes hydrolysis of the seed starches and proteins and extraction of them to the aqueous phase. As seen from FIG. 4, pH of the aqueous phase is reducing with increasing reaction temperature, which can be explained by the partial degradation of the hydrolyzed carbohydrates to organic acids. As seen in FIG. 5, TOC is increasing due to intensifying carbohydrate and protein extraction rate. The aqueous phase was collected and stored at 4° C. for using in the subcritical water carbonization of extracted oilseeds experiments.

The next step is Soxhlet extraction of the oilseeds with n-hexane. 10 grams of both ground seeds and seeds pretreated at 120, 150, 180, and 210° C. were extracted with 200 mL of hexane in a Soxhlet apparatus for 120 minutes (8 cycles). After the extraction, hexane was removed by vacuum evaporation to constant weight, and the oil was gravimetrically quantified and labeled. The oil yield (in g/100 g of dry seeds) after each extraction was calculated from the mass of extracted oil and the mass of seeds used for the extraction. The extracted seeds were dried in an oven at 65±3° C. and stored at room temperature for analyses and using in the subcritical water carbonization experiments. The results of the oil extraction from the pretreated and ground seeds are provided in FIG. 6.

Figure 6:
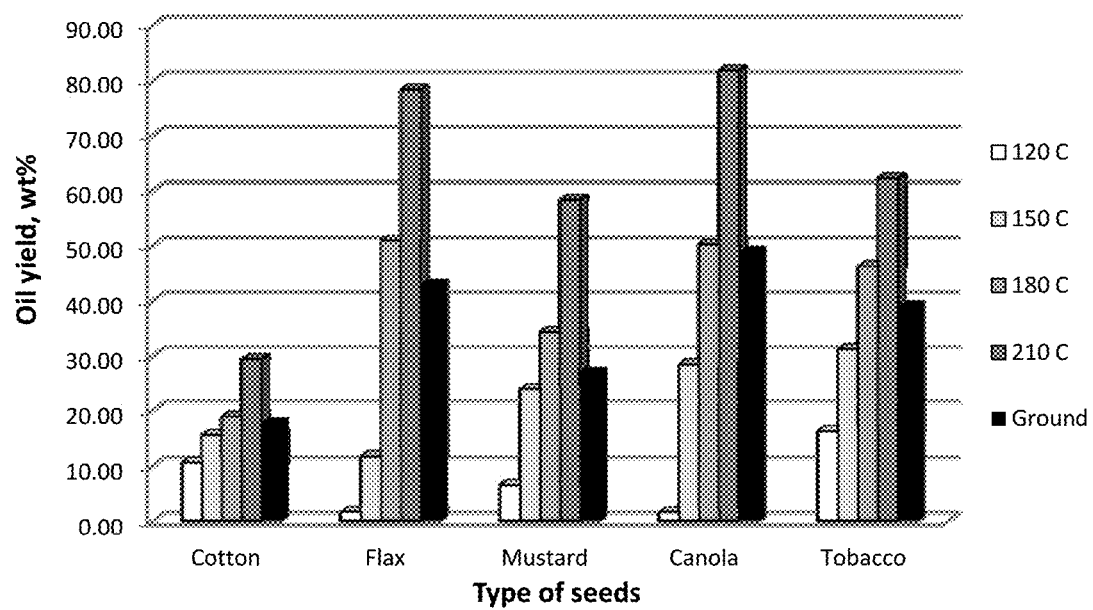
FIG. 6 is a table of the oil yields from both ground seeds and seeds subjected to subcritical water pretreatment.

As can be seen from FIG. 6, the oil yields from all the seeds pretreated at 180 and 210° C. were significantly higher than from the respective ground seeds. The oil yield from the cotton, flax, mustard, canola, and tobacco seeds pretreated at 210° C. was higher than from the respective ground seeds by 11.6%, 35.3%, 31.3%, 32.9%, and 23.2% accordingly and reached as much as 82% for canola seeds. The oils extracted from the seeds pretreated at 180 and 210° C. typically had darker color than the oils extracted from respective ground seeds, which can be explained by the presence of colloid carbon particles as well as free fatty acids (FFAs) as a result of the partial degradation of triacylglycerols at higher temperatures.

Calculations of the oil yields on a raw (unpretreated) seed basis showed that oil yields of most of the seeds pretreated at 210° C. exceeds the oil yield of respective ground seeds by up to 6%. The results of the oil extraction from the pretreated and ground seeds on a raw seed basis are provided in FIG. 7. This phenomenon can be explained by the more porous structure of the pretreated seeds with greater surface area compared to that of the ground seeds, which makes the oils more accessible to solvents such as n-hexane. The partial hydrolysis and removal of the carbohydrates and proteins from the oilseeds to the aqueous phase in the pretreatment step changes the oilseeds structure and increases their porosity and surface area. In order to confirm this, BET surface area and pore size/volume analysis was performed on the extracted oilseeds as described below.

In order to add value to the subcritical water pretreatment and oil extraction process, extracted canola seeds pretreated at 210° C. were subjected to subcritical water carbonization in a 500 mL batch reactor equipped with a Parr 4848 controller. 10 grams of the extracted seeds and 300 mL of the aqueous phase obtained after the seeds' pretreatment were loaded into the reactor, sealed, and kept under the temperature of 300° C. and autogenous pressure of 1220±5 psi for 60 minutes. After the reactor was cooled down to ambient temperature, the solid and liquid phases were separated by vacuum filtration and the solid phase was dried in an oven at 65±3° C. overnight. The dry weight of the carbonized solids (green coal) was 5.5 g (55 wt %).

Elemental analysis of the raw, pretreated, extracted, and carbonized canola seeds was carried out with ThermoFinnigan Flash EA 1112 automatic elemental analyzer and higher heating values of all the samples were calculated using Dulong's formula. The results of the analysis are provided in Table 2.

TABLE 2

| Sample | N, wt % | C, wt % | H, wt % | O, wt % | HHV*, MJ/kg |
|---|---|---|---|---|---|
| Raw canola seeds | 3.227 | 58.39 | 9.293 | 29.09 | 27.837 |
| Pretreated canola seeds | 1.273 | 67.441 | 10.647 | 20.64 | 34.38 |
| Extracted canola seeds | 5.152 | 50.218 | 6.148 | 38.482 | 18.898 |
| Canola seedcake green coal | 4.868 | 64.221 | 6.606 | 24.305 | 26.466 |

*HHV was calculated using Dulong's formula: HHV (MJ/kg) = 33.5 (C %) + 142.3 (H %) − 15.4 (O %) − 14.5 (N %)

As can be seen from the above table, the extracted canola seeds contain a high amount of nitrogen, which indicates a high protein content that can find a proper application. If carbonized with subcritical water, it gives green coal of a good quality (26.5 MJ/kg) comparable with bituminous coal.

Figure 8:
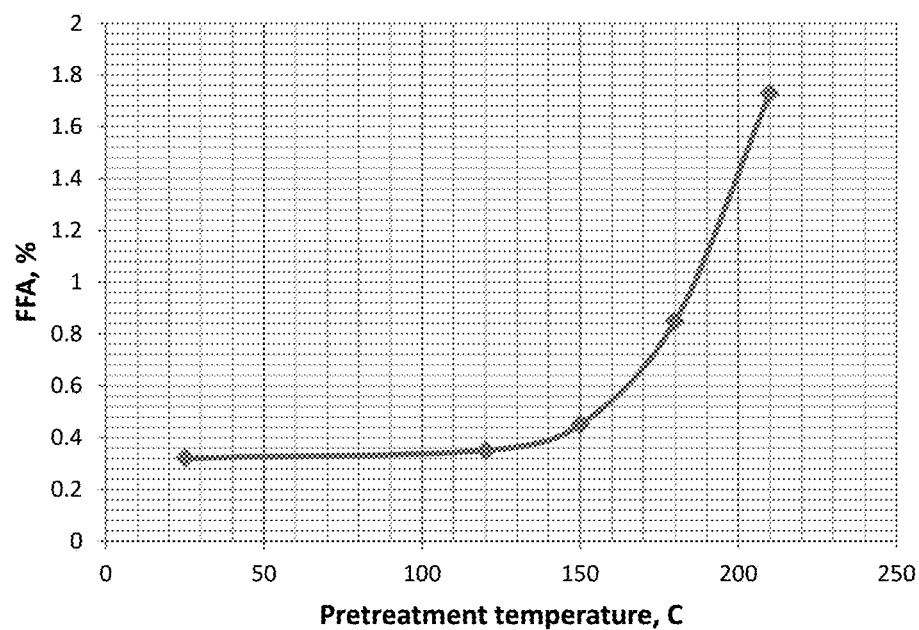
FIG. 8 is a graph of the fatty acid concentrations in the oils extracted from both the ground seeds and the seeds subjected to subcritical water pretreatment.

In order to evaluate the possible degradation of the canola seed oil in a pretreatment step, fatty acid (FFA) concentrations were determined in all the extracted oils. The oils were titrated with 0.1% NaOH solution, and the results obtained are shown in FIG. 8. As seen from FIG. 8, the FFA concentrations are increasing slightly with increasing pretreatment temperature. Therefore, the degradation of the extracted oils at the pretreatment temperatures studied was insignificant.

Additionally, the oils extracted from the raw and pretreated at 210° C. canola seeds were analyzed with SRI-GC8610C chromatograph equipped with Restek MXT-WAX capillary column and a flame ionization detector (FID) to compare their FFA profiles. Helium at 19 psi was used as a carrier gas. The temperature program was as follows: the initial oven temperature 120° C., hold for 3 min, ramp at 20° C./min to 220° C., hold for 10 min; injector temperature 230° C., detector temperature 250° C.

The oil samples were subjected to transesterification with methanol and NaOH (0.35% methoxide). The obtained fatty acid methyl esters (FAMEs) were washed with deionized water, re-dissolved in n-hexane, separated from the water phase, dried over anhydrous $Na_2SO_4$, recovered by vacuum evaporation, and dissolved in chloromethane (1:10). 1 μL of each sample was injected into the column. FAMEs were identified by comparing their retention times and peak areas to those of the standards. The FFA profiles of the both samples were consistent with known canola seed oil profiles. The composition of the oils extracted from the ground seeds and seeds pretreated at 210° C. is shown in Table 3.

TABLE 3

| | Fatty acid composition, wt % | | | | |
|---|---|---|---|---|---|
| Sample | Palmitic (16:0) | Stearic (18:0) | Oleic (18:1) | Linoleic (18:2n6) | Linolenic (18:3n3) |
| Ground seeds | 7.9 ± 0.5 | 2.0 ± 0.5 | 57.2 ± 0.5 | 19.7 ± 0.5 | 13.2 ± 0.5 |
| Pretreated seeds | 7.8 ± 0.5 | 2.0 ± 0.5 | 57.0 ± 0.5 | 20.5 ± 0.5 | 12.7 ± 0.5 |

No significant difference was observed in composition of the oils extracted from the ground seeds and the pretreated canola seeds, indicating no degradation.

BET analysis was carried out with NOVA 2000e surface area and pore size analyzer (Quantachrome Instruments). The ground seeds and seeds pretreated at 210° C. after Soxhlet extraction were used for the analysis. The results shown in Table 4 were obtained:

TABLE 4

| Sample | Surface area, $m^2$/g (MultiBET) | Pore volume, cc/g (HK method) | Pore diameter, Å (Kr87) |
|---|---|---|---|
| Raw seeds | 1.265 | 7.096 * $10^{-4}$ | 20.745 |
| Pretreated seeds | 5.336 | 88.40 * $10^{-4}$ | 43.998 |

As seen from the table, the surface area, pore volume, and pore size for the hydrothermally pretreated canola seeds were greater than those for the raw seeds. This explains the faster oil extraction and the higher oil yields from the pretreated seeds on a raw seeds basis.

Figure 7:
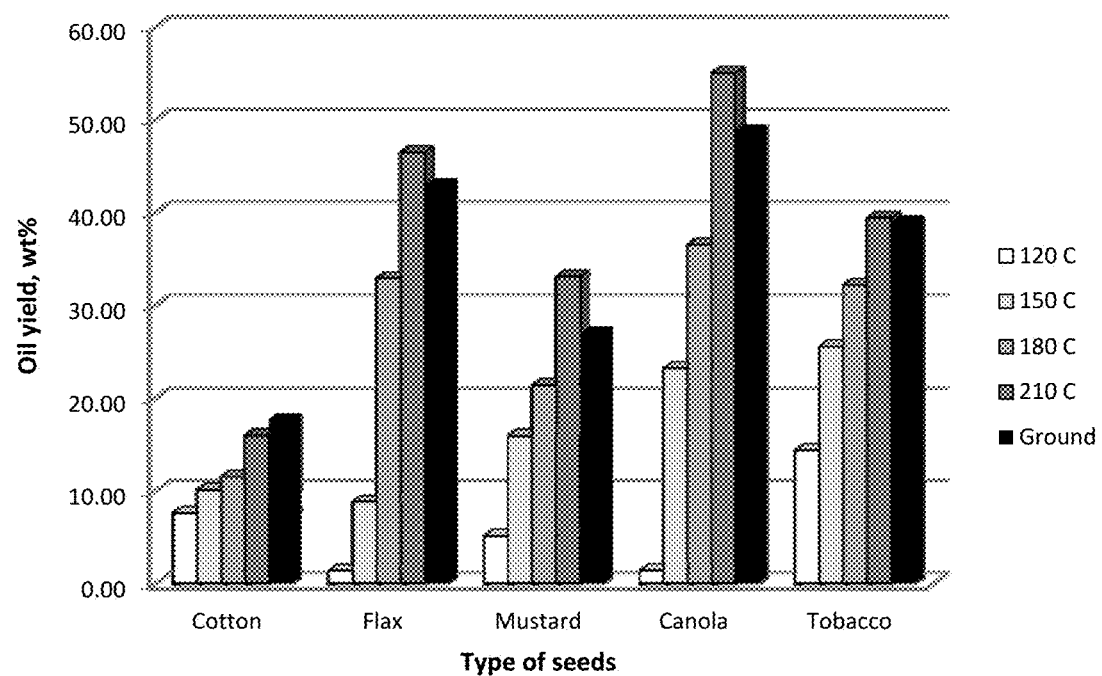
FIG. 7 is a table of the oil yields from both ground seeds and seeds subjected to subcritical water pretreatment on a raw seed basis.

As it can be clearly seen from FIGS. 6 and 7, the subcritical water pretreatment and extraction process for all the oilseeds pretreated at 180 and 210° C. provided significantly higher oil yields than those from the respective ground seeds. The oil yield from the cotton, flax, mustard, canola, and tobacco seeds pretreated at 210° C. was higher than from the respective ground seeds by 11.6%, 35.3%, 31.3%, 32.9%, and 23.2% respectively and reached as much as 82% for canola seeds. Calculations of the oil yields on a raw (unpretreated) seed basis showed that oil yields of the flax, mustard, and canola seeds pretreated at 210° C. exceeded the oil yield of respective ground seeds by 3.43, 6.03, and 6.18% respectively. From BET analysis of the surface area and pore size/volume of the extracted canola seeds (Table 4), it can be seen that all the characteristics for the pretreated seeds were greater than those for the respective ground seeds. The hydrothermal pretreatment makes the oil more accessible for n-hexane and explains the faster oil extraction and higher oil yield from the pretreated seeds on a raw seeds basis without significant degradation of the extracted oil (FIG. 8, Table 3).

Figure 9A:
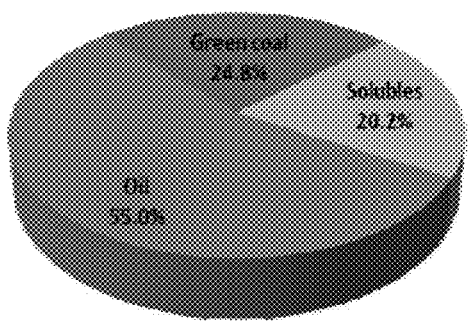
FIG. 9A is a graph illustrating the mass distribution of products from oilseeds after the processes disclosed herein.
Figure 9B:
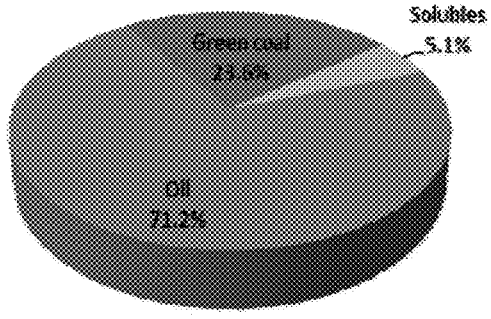
FIG. 9B is a graph illustrating the energy (ECR) distribution of products from oilseeds after the processes disclosed herein.

Table 5 and FIGS. 9A and 9B provide the mass and energy distribution of all products obtained during the subcritical water pretreatment and extraction of canola seeds at 210° C. Energy conversion ratios (ECRs) were calculated for both oil and green coal using the data from Table 2 and the following formulae:

$$ECR_O = (m_O * HHV_O/(m_S * HHV_S))100\% \quad (1)$$

$$ECR_C = (m_C * HHV_C/m_S * HHV_S)100\% \quad (2)$$

Where
$m_O$—mass of the oil extracted, g
$HHV_O$—heating value of the oil, MJ/kg
$m_S$—mass of the oilseeds, g
$HHV_S$—heating value of the oilseeds, MJ/kg
$m_C$—mass of the green coal produced, g
$HHV_C$—heating value of the coal, MJ/kg As seen from FIGS. 9A and 9B, the integrated process obtains 55% oil and 25% green coal from the canola seeds, which energy content accounted to 71 and 24% respectively (the overall ECR was 95%).

TABLE 5

| Sample | Mass, g | Mass, wt % | HHV, KJ/g | Energy content, KJ | ECR, % |
|---|---|---|---|---|---|
| Raw seeds | 10.00 | 100.00 | 27.80 | 278.00 | 100.00 |
| Oil | 5.50 | 55.00 | 36.00 | 198.00 | 71.22 |
| Green coal | 2.48 | 24.80 | 26.50 | 65.72 | 23.64 |
| Soluble organics | 2.02 | 20.20 | 7.07 | 14.28 | 5.14 |

Figure 10:
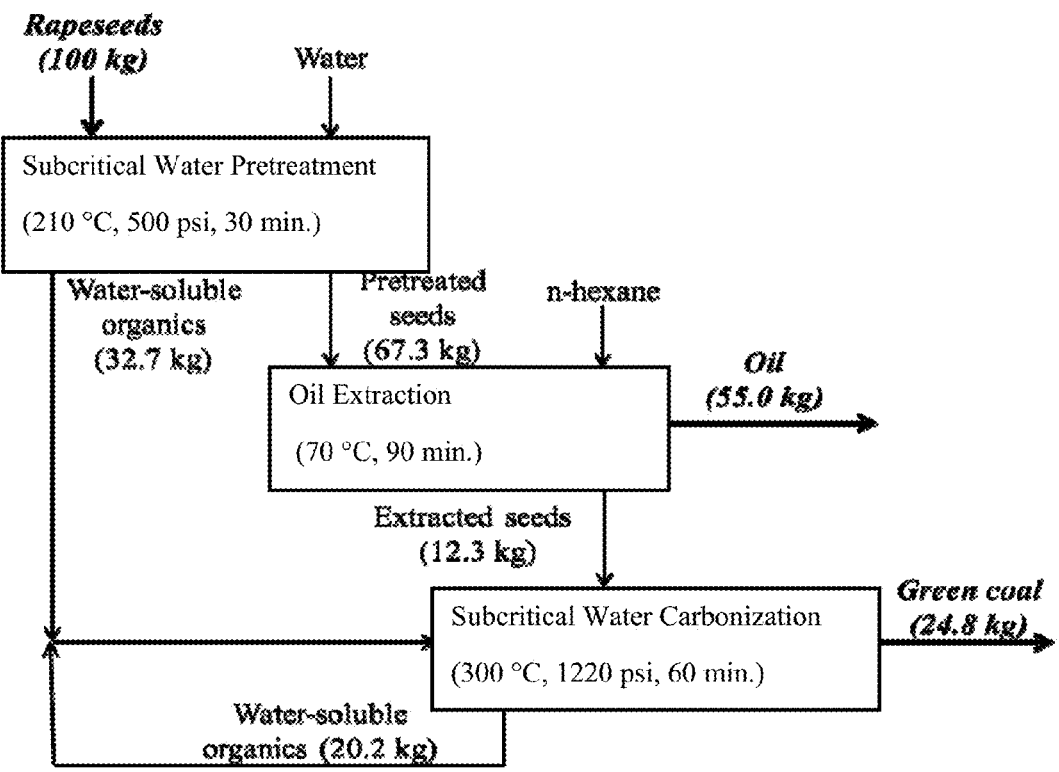
FIG. 10 is a flow diagram of the material balance of the processes disclosed herein.

To determine the process yields, mass balance around subcritical water pretreatment of the canola seeds, solvent oil extraction, and subcritical water carbonization of the seedcake was developed and summarized in FIG. 10. The raw canola seeds (100 kg, on a dry basis) were subjected to the hydrothermal pretreatment at 210° C. for 30 minutes yielding 63.7 kg of partially hydrolyzed seeds and 32.7 kg of water-soluble organic products. The pretreated seeds were extracted with n-hexane for 90 minutes yielding 55.0 kg of oil and 12.3 kg of extracted seedcake. The latter was mixed with the water-soluble organic products from the pretreatment step, subjected to the subcritical water carbonization at 300° C. for 60 minutes, and resulted in producing 24.8 kg of green coal and 20.2 kg of water-soluble organics, which was further recycled for the next subcritical water carbonization step. The integrated process produces 55% high quality oil, which can be used for biodiesel production, and 25% green coal, thus utilizing 80% of the canola seeds with an overall ECR of 95%.

The subcritical water pretreatment and extraction is a novel integrated process that employs hydrothermal pretreatment and oil extraction steps followed by hydrothermal carbonization of the extracted seeds. The integrated process provides several major advantages over conventional processes: higher oil yield, shorter extraction time, tolerance to high moisture content of the feedstock, avoiding preparation stages, and utilization of the extracted solid residue for green coal production. The disclosed process can be integrated with biodiesel productions. The integration of oil extraction with green coal production adds value to the extracted oil and increases the overall ECR of the oilseeds up to 95%. Hydrothermal pretreatment of oilseeds is an efficient step that makes it possible to significantly increase the oil yield during the following solvent extraction step. The higher oil yield obtained from hydrothermally pretreated seeds and faster oil extraction compared to that of ground seeds can be explained by the partial hydrolysis of carbohydrates and proteins, thus making the solid phase richer in oils and increasing its surface area and pore size/volume. The disclosed integrated process can be an efficient way of simultaneous oil extraction and solid fuels production from different oilseeds.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for optimizing energy recovery from an oilseed comprising:
   pretreating whole oilseeds with subcritical water at a pretreatment temperature;
   separating pretreated oilseeds from a pretreated liquid phase; and
   extracting oil from the pretreated oilseeds using an organic solvent.

2. The process of claim 1, wherein the pretreatment temperature is between about 180° C. and 220° C.

3. The process of claim 1, wherein pretreating occurs for a period between 5 minutes and 60 minutes.

4. The process of claim 1, wherein the whole oilseeds are one or more of cotton seeds, rapeseeds, mustard seeds, jathopha seeds, sunflower seeds, safflower seeds, tobacco seeds, sesame, soybeans, flaxseeds, and canola seeds.

5. The process of claim 1, wherein the organic solvent is selected from n-hexane, ethanol, methanol, chloroform, acetone, dichloromethane, and petroleum ethers.

6. The process of claim 1 further comprising:
   separating a solid phase from the oil after extraction;
   producing green coal from the solid phase with subcritical water carbonization of the solid phase at a carbonization temperature.

7. The process of claim 6 further comprising:
   producing green coal also from the pretreated liquid phase with subcritical water carbonization of the liquid phase at the carbonization temperature.

8. The process of claim 6, wherein the pretreatment temperature is between about 180° C. and 220° C.

9. The process of claim 6, wherein pretreating occurs for a period between 5 minutes and 60 minutes.

10. The process of claim 6, wherein the whole oilseeds are one or more of cotton seeds, rapeseeds, mustard seeds, jathopha seeds, sunflower seeds, safflower seeds, tobacco seeds, sesame, soybeans, flaxseeds, and canola seeds.

11. The process of claim 6, wherein the carbonization temperature is between about 220° C. and 300° C.

12. The process of claim 1 further comprising:
   separating a solid phase from the oil after extraction;
   producing green coal from the solid phase and from the pretreated liquid phase with subcritical water carbonization of the solid phase and the pretreated liquid phase at a carbonization temperature and a carbonization pressure.

13. The process of claim 12, wherein the carbonization temperature is between about 220° C. and 300° C.

14. The process of claim 12, wherein the carbonization pressure is about 1220 psi.

* * * * *